United States Patent
Garwood

(10) Patent No.: US 8,911,809 B2
(45) Date of Patent: *Dec. 16, 2014

(54) METHOD OF SEPARATING MEAT COMPONENTS VIA CENTRIFUGE

(75) Inventor: Anthony J. M. Garwood, Mercer Island, WA (US)

(73) Assignee: SafeFresh Technologies, LLC, Mercer Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/452,526

(22) Filed: Apr. 20, 2012

(65) Prior Publication Data

US 2012/0282382 A1 Nov. 8, 2012

Related U.S. Application Data

(63) Continuation of application No. 11/720,594, filed as application No. PCT/US2005/043507 on Dec. 2, 2005, now Pat. No. 8,178,144, which is a continuation-in-part of application No. 11/004,669, filed on Dec. 2, 2004, now abandoned.

(60) Provisional application No. 60/639,828, filed on Dec. 28, 2004.

(51) Int. Cl.

| | |
|---|---|
| A23L 3/3445 | (2006.01) |
| A23B 4/16 | (2006.01) |
| B01D 21/26 | (2006.01) |
| A22C 17/00 | (2006.01) |
| A23B 4/24 | (2006.01) |
| A23B 4/26 | (2006.01) |
| A23L 1/015 | (2006.01) |
| A23L 1/31 | (2006.01) |
| A23L 1/317 | (2006.01) |
| A23L 3/015 | (2006.01) |
| B04B 1/20 | (2006.01) |

(52) U.S. Cl.
CPC ............... *A23B 4/16* (2013.01); *B01D 21/262* (2013.01); *B04B 1/20* (2013.01); *A22C 17/00* (2013.01); *A23B 4/24* (2013.01); *A23B 4/26* (2013.01); *A23L 1/015* (2013.01); *A23L 1/31* (2013.01); *A23L 1/317* (2013.01); *A23L 3/0155* (2013.01); *A23L 3/3445* (2013.01); *A23V 2002/00* (2013.01)
USPC ........... 426/332; 426/335; 426/646; 426/417; 426/480; 426/495

(58) Field of Classification Search
CPC .............. A23D 9/02; A23D 9/04; C11B 1/14; A23L 1/317; A23L 1/313; A23J 3/04; B01D 21/262; B04B 1/20
USPC ......... 426/332, 335, 646, 417, 478–480, 490, 426/495, 518
See application file for complete search history.

(56) References Cited

U.S. PATENT DOCUMENTS

| | | | | |
|---|---|---|---|---|
| 2,086,072 A | * | 7/1937 | Fauth et al. | ............. 426/426 |
| 3,451,990 A | * | 6/1969 | Sole, Jr | ............. 530/370 |

(Continued)

*Primary Examiner* — Drew Becker
(74) *Attorney, Agent, or Firm* — Christensen O'Connor Johnson Kindness PLLC

(57) ABSTRACT

A centrifuge has an inner and an outer screw. The outer screw transfers material towards a cone-shaped section that leads to an outlet of the centrifuge. A mixture of meat components, liquid carbon dioxide, gas, and optionally water, is spun in the centrifuge. The dense components, such as lean meat, will accumulate away from the axis of rotation and be transferred by the outer screw towards the cone-shaped section. The less dense components, such as fat and adipose tissue, accumulate toward the center of rotation, and are transferred toward an outlet of the centrifuge via the inner screw. Gas accumulates in the proximity of the cone-shaped section and impedes liquid carbon dioxide from exiting with the dense components. The centrifuge is pressurized, which maintains carbon dioxide as a liquid.

9 Claims, 2 Drawing Sheets

(56) References Cited

U.S. PATENT DOCUMENTS

| | | | |
|---|---|---|---|
| 3,780,191 A | 12/1973 | Langer | |
| 4,137,335 A * | 1/1979 | Holm et al. | 426/417 |
| 4,778,682 A * | 10/1988 | Chapman | 426/248 |
| 5,147,672 A * | 9/1992 | McLachlan et al. | 426/241 |
| 5,221,554 A * | 6/1993 | Gamay | 426/646 |
| 5,435,443 A | 7/1995 | Hohenester | |
| 5,514,396 A * | 5/1996 | Mahboob | 426/243 |
| 5,552,173 A * | 9/1996 | Singh et al. | 426/417 |
| 5,650,187 A * | 7/1997 | Franklin et al. | 426/417 |
| RE36,173 E * | 3/1999 | Margolis | 426/646 |
| 5,944,597 A * | 8/1999 | Singh et al. | 452/134 |
| 6,159,515 A * | 12/2000 | Schaefer et al. | 426/417 |
| 6,916,493 B2 * | 7/2005 | Morelli et al. | 424/665 |
| 6,949,265 B1 * | 9/2005 | Schaefer et al. | 426/417 |
| 8,178,144 B2 * | 5/2012 | Garwood | 426/315 |
| 2002/0122856 A1 | 9/2002 | Garwood | |
| 2003/0091708 A1 | 5/2003 | Garwood | |
| 2003/0129274 A1 | 7/2003 | Garwood | |
| 2003/0152679 A1 * | 8/2003 | Garwood | 426/392 |
| 2003/0165602 A1 | 9/2003 | Garwood | |
| 2003/0170357 A1 | 9/2003 | Garwood | |
| 2003/0170359 A1 | 9/2003 | Garwood | |
| 2003/0175392 A1 | 9/2003 | Garwood | |
| 2003/0185937 A1 | 10/2003 | Garwood | |
| 2003/0185948 A1 | 10/2003 | Garwood | |
| 2003/0215551 A1 | 11/2003 | Garwood | |
| 2004/0081729 A1 | 4/2004 | Garwood | |
| 2004/0146602 A1 | 7/2004 | Garwood | |
| 2004/0185152 A1 | 9/2004 | Garwood | |
| 2004/0185154 A1 | 9/2004 | Garwood | |
| 2004/0185155 A1 | 9/2004 | Garwood | |
| 2004/0185156 A1 | 9/2004 | Garwood | |
| 2005/0042346 A1 | 2/2005 | Garwood | |
| 2005/0142250 A1 | 6/2005 | Garwood | |
| 2005/0208188 A1 | 9/2005 | Garwood | |
| 2006/0029699 A1 | 2/2006 | Garwood | |
| 2006/0147588 A1 | 7/2006 | Garwood | |
| 2009/0214733 A1 | 8/2009 | Garwood | |
| 2009/0226586 A1 | 9/2009 | Garwood | |
| 2010/0112168 A1 | 5/2010 | Garwood | |
| 2011/0171353 A1 | 7/2011 | Garwood | |

* cited by examiner

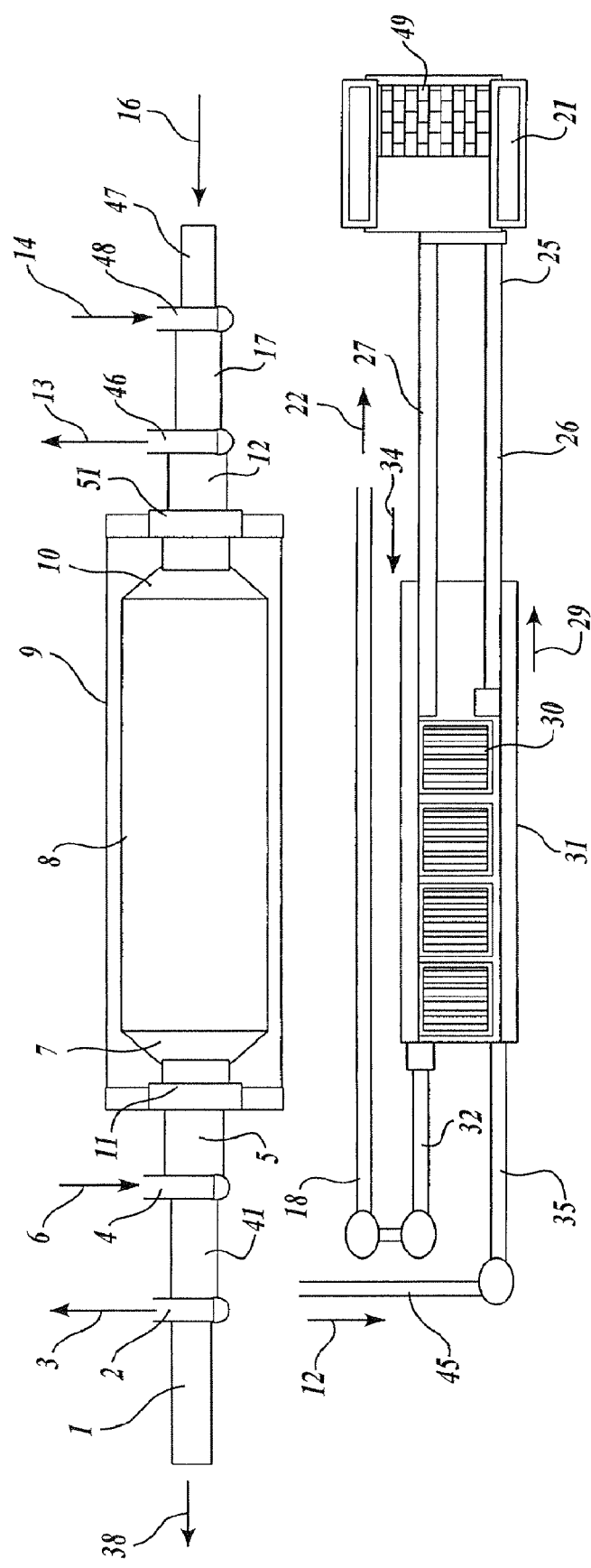
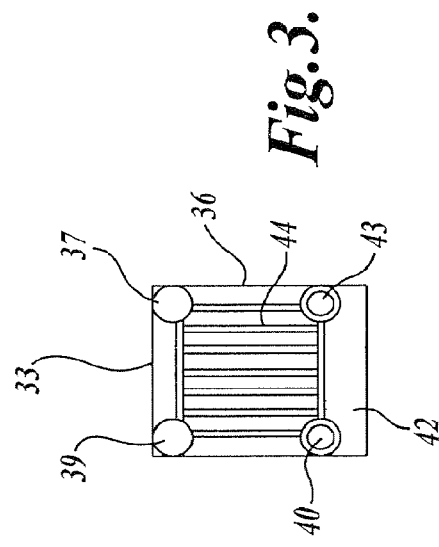
Fig.2.
Fig.3.

METHOD OF SEPARATING MEAT COMPONENTS VIA CENTRIFUGE

CROSS-REFERENCES TO RELATED APPLICATIONS

This application is a continuation of U.S. patent application Ser. No. 11/720,594, filed Apr. 30, 2009, which is the U.S. national stage entry of International Patent Application No. PCT/US2005/043507, filed Dec. 2, 2005, which is a continuation-in-part of U.S. patent application Ser. No. 11/004,669, filed Dec. 2, 2004, and claims the benefit of U.S. Provisional Application No. 60/639,828, filed Dec. 28, 2004. All applications are incorporated herein expressly by reference.

FIELD OF THE INVENTION

The present invention relates to the separation of meat components via a centrifuge.

BACKGROUND

In the process of boning a carcass, the external fat layer is removed. During this process, a significant amount of lean meat can be cut from the carcass and discarded with the fat. This process leads to a significant loss of lean meat. To recover the lean meat, the discarded fat was heated and processed in a centrifuge to separate the fat from the lean meat. The lean meat was then frozen and chipped into small flakes. The finished product, known as Lean Finely Textured Beef (hereinafter "LFTB") could later be added to ground beef, for example. The temperature of the LFTB during the separation process is not high enough and long enough to kill bacteria. As a result, pathogens and bacteria that are present on the surfaces of the carcass prior to boning can result in bacteria being present in the LFTB.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A "Decanter Style" centrifuge has a horizontally disposed tubular shaped rotating "bowl" with a cone-shaped section enclosing each end of the tube shaped "bowl" at each end. An inner and an outer screw are mounted centrally, in horizontal disposition within the "bowl". The inner screw transfers material towards one of the cone-shaped sections that leads to an outlet of the centrifuge. A mixture of temperature controlled ground meat (for example beef), temperature controlled liquid phase and gaseous phase and/or vapor phase carbon dioxide, gas, and water, is loaded into and then spun within the centrifuge. The higher density components, such as lean (muscle) meat, will accumulate against the inner surface of the spinning "bowl", away from the central axis of bowl rotation and is then transferred by the outer screw towards a cone-shaped section. The lower density components, such as fat and fatty adipose tissue, accumulate toward the center of rotation, and are transferred toward an outlet via the inner screw. Gaseous phase carbon dioxide accumulates in the center of centrifuge, closest to the axis of rotation and in proximity of the cone-shaped section. The lean meat and fat are transferred out through narrow conduits, while the gas stratum displaces liquid carbon dioxide from the conduits through which they are removed, which can substantially reduce the loss of any liquid carbon dioxide. The centrifuge is pressurized at a pressure, such as about 550 psig, which can maintain carbon dioxide as a liquid at about 34 degrees F. Additionally, pressurized and temperature controlled carbon dioxide with water forms carbonic acid which can kill bacteria and pathogens.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 2 schematically illustrates a heat exchanger assembly in accordance with one embodiment of the present invention; and FIG. 3 illustrates a single plate of a plate heat exchanger.

DETAILED DESCRIPTION

Figure 1:
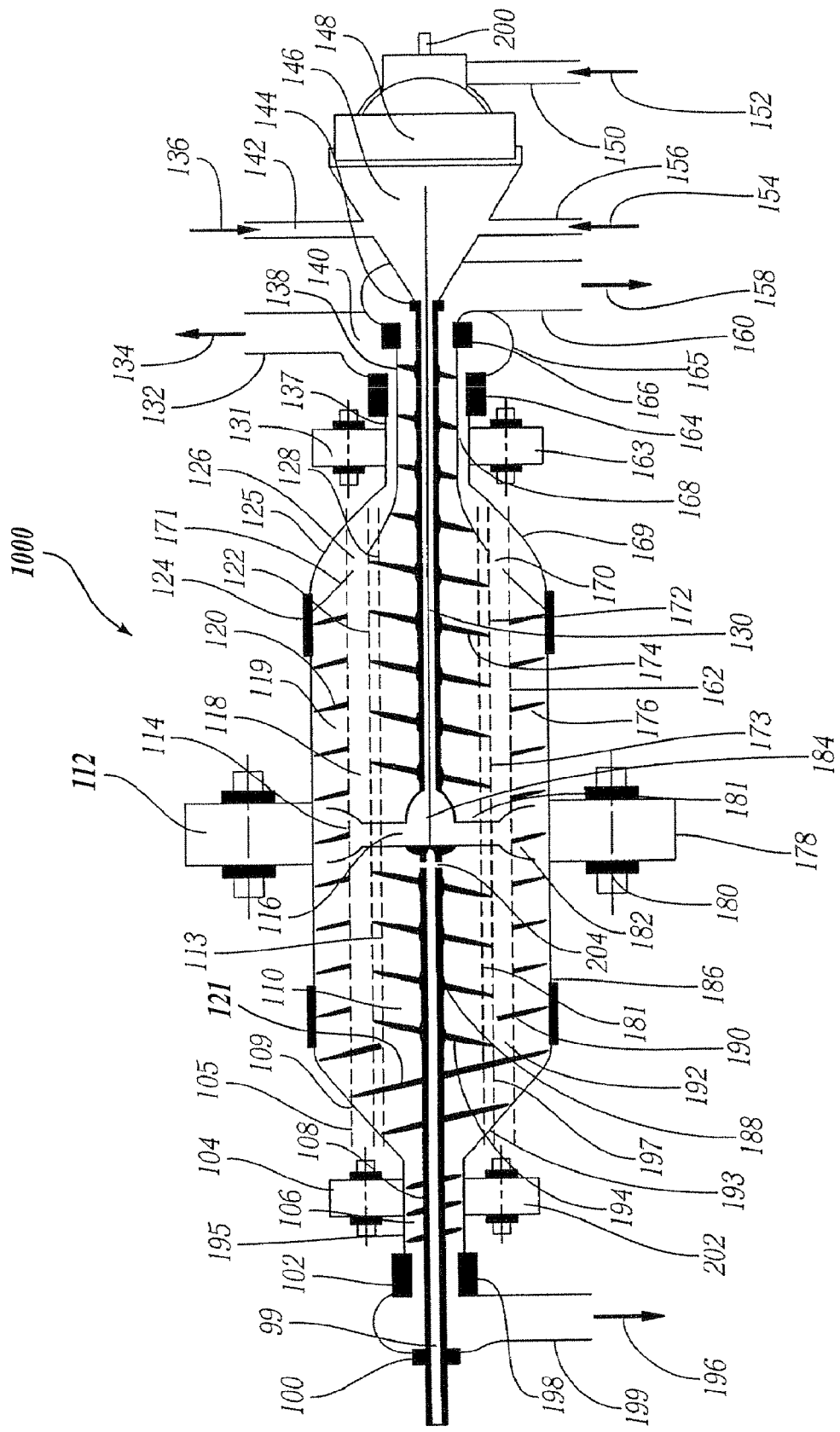
FIG. 1 illustrates a centrifuge to separate meat in accordance with one embodiment of the present invention.

FIG. 1 is a diagrammatic representation of a cross section through a centrifuge in accordance with one embodiment of the present invention. The centrifuge 1000 includes a housing 186 (the "bowl"). The housing 186 is generally horizontally disposed and cylindrical in shape with cone-shaped sections enclosing a space therein. The housing 186 comprises a cylindrical shaped "bowl" with a first cone-shaped section 109 at one end of the housing 186. A second cone-shaped section 125 is located at a second and opposite end of the "bowl". The cone-shaped section 109 tapers down in diameter from that of the housing 186 to a smaller diameter defining a cylindrical conduit section 195. Section 195 leads to a manifold, which is ultimately connected to outlet 199. Similarly, the cone shaped section 125 tapers down in diameter from that of the housing 186 to a smaller diameter defining a cylindrical conduit section 137. Section 137 leads to a manifold section 165, which is connected to the outlet 132. The cone-shaped section 125 has an inwardly facing beach face at 171 within the interior thereof. The beach face at 171 encloses an annular space created between the beach face 171 wall and the outer vessel wall at 125. The annular space communicates directly with annular space 168 enclosed within conduit section 138 which connects directly with manifold 165 and then to outlet 132. The beach face 171 has ports 126, 170 that allow fluid material comprising substantially liquid phase carbon dioxide to be removed from the centrifuge 1000 via the outlet 132. The cone-shaped section 109 is in close and near contacting relationship with an outer screw. The cone profiled beach face 171 is in close and near contacting relationship with inner screw 174. The inner beach face of cone-shaped section 109 is provided to enable extraction of matter such as lean beef, that accumulates against the inner face of cylindrical housing 186 by the rotating action of outer screw 120, whereas beach face at 171 is provided to enable the extraction of matter, such as beef fat, after accumulation within the space defined by broken lines 122 and 128, through the conduit 138, and discharged from outlet 160. It is to be appreciated that the use of the terms "lean meat" or "fat" are generalized definitions, in the sense, that "lean meat" may contain some fat, but the lean meat is the predominant component. Similarly, the term "fat" is generalized to mean material wherein fat is the predominant component, but it may include some lean meat.

It can be seen that the centrifuge sections 195, 109, 186, 125, and 137, are connected together to provide a single pressure vessel, which is configured to rotate as a single enclosed sealed and pressurized unit. Bearings support the pressure vessel 1000 which enable the unrestricted rotation thereof. The pressure vessel 1000 is supported by bearings 100, 102, 198, 138, and 164, and bearings at 166 and 144. All bearings are sealed to prevent escape of carbon dioxide gas or other fluids. The centrifuge assembly 1000 is driven by surface drive wheels 104 and 202, and drive wheels 131 and 163. Drive wheels 112 and 178 are disposed at about the middle of the centrifuge 1000. Drive wheels rotate the centrifuge at approximately 500 rpm. The centrifuge 1000 includes a central shaft 108 which is supported by bearings 100 and 144 at respective ends thereof that permit shaft 108 to rotate. Bearings 100 and 144 also seal the central shaft 108 against gas or liquid seepage. The shaft 108 can have a hollow core providing a conduit 99 through the center of the shaft 108. The shaft 108, therefore, provides an inlet for a gas to be injected within the interior of the centrifuge 1000. For example, any gas, including carbon dioxide, carbon monoxide, any noble gas, or gas combinations, can be injected through the hollow core 99 of the shaft 108. The gas exits within the centrifuge 1000 through apertures 204 disposed in the shaft 108 at about the center of the centrifuge 1000. In one embodiment, the shaft includes spirals (Archimedes screws). However, other embodiments may include paddles, or other means for transferring material, such as conveyors, etc. The shaft 108 includes an inner spiral 174 and an outer spiral 120. The outer spiral 120 transfers matter accumulated against the interior surface of the housing 186 and transfers the matter toward the cone-shaped section 109, through the narrow cylindrical conduit 195, and is then discharged through outlet 199. The outer spiral includes the spiral section 120, which has a diameter approximately equal to the inside diameter of the housing 186. However, the individual flights in the spiral section 120 are not attached to shaft 108, but nevertheless, form a continuous spiral. The outer spiral section 120 is connected via a transition spiral section 121 at the cone-shaped section 109, which does have individual flights connected to shaft 108, but decrease in diameter in conformance with the cone-shaped section 109. The transition spiral section 121 connects to a smaller diameter spiral section 106 in the cylindrical section 195. In this manner, it can be appreciated that material that accumulates in against the interior surface of housing 186 in zone 119 will be transferred toward the cone-shaped section 109 and is eventually discharged through the outlet 199 as indicated by the direction of arrow 196. The inner screw or spiral includes the left spiral section 188, which is located within the outer spiral section 120. The inner spiral includes the right spiral section 174, which is also located within the outer spiral section 120. The spiral section 174 has flights that decrease in diameter in proximity to beach face 171, which transitions to even smaller diameter flights within the cylindrical section 138. In this manner, material that accumulates toward the center axis of the centrifuge 1000, such as at stratum 193, will be transferred toward the cone-shaped section 125, through narrowed conduit 138, and eventually discharged from outlet 160, as indicated by the arrow 158. In one embodiment, the inner spiral sections may have a left hand spiral, while the outer spiral sections may have a right hand spiral, or vice versa. In another embodiment, both the inner spiral and the outer spiral can have the same direction. In the latter case, the inner spiral and the outer spiral can be driven independently of one another in opposing directions, so as to cause material to be transferred in two directions. In the former embodiment, both the inner spiral and the outer spiral can be disposed on a single shaft, as illustrated. Thus, the rotation of the shaft 108 will cause material to be transferred in opposing directions by the inner spiral and the outer spiral, and out through respective outlets in accordance with whether the material is a dense material or a less dense material.

More particularly, a planetary gear arrangement can be provided so as to connect the housing 186 and shaft 108 through a planetary gear arrangement having a ratio such that the screw assembly will rotate relative to the housing 186 at a speed sufficient to transfer stratified materials from within the centrifuge at a suitable rate approximately equal to the rate of mass flow of goods transferred into the centrifuge.

The right side of the shaft 108 also has a hollow core forming the conduit 130. In the illustrated embodiment, the conduit 130 is in communication with a cone-shaped vessel 146. The vessel 146 is located downstream from a meat grinder plate 148. The meat grinder 148 is driven by a shaft 200, which is connected to a driver (not shown). The meat grinder 148 is fed through inlet 150, as indicated by arrow 152. Liquid carbon dioxide, and optionally water, is introduced into vessel 146 via conduits 142 and 156, as indicated by arrows 136 and 154. Liquid carbon dioxide and ground meat combine in the cone-shaped vessel 146, which leads to the conduit 130. Material travels through conduit 130 and eventually exits into the interior of the centrifuge housing 186 at a distributor 184 via the outlets 116 and 182. Ground meat will be composed of particulate materials, including lean meat, fat tissue, and adipose fat tissue. Pressure and temperature are controlled within the centrifuge housing 186 to maintain carbon dioxide in the liquid state. However, gas, such as carbon dioxide gas, is also present within the housing 186 of the centrifuge 1000. The gas is introduced via the conduit 99 from the left side of the shaft 108. The mixture, including ground meat comprising lean meat and fat, liquid carbon dioxide, gaseous carbon dioxide, and optionally water, is centrifugally spun within the housing 186 of the centrifuge 1000. In one embodiment, the temperature of the carbon dioxide gas introduced via conduit 99 may be elevated to about 100 degrees Fahrenheit so that the density of the gas will be substantially lowered. The object is to reduce the amount of carbon dioxide that is used in the centrifuge for cost savings.

Through centrifugal force created by rotation, stratification of materials within the centrifuge 1000 is produced. The most dense components, such as heavier lean meat, will accumulate on the interior side of the housing 186, in the strata defined by the dotted line 105. These denser components are transferred via the outer screw 120 towards the cone-shaped section 109, through the narrowed section 195, and eventually out through the conduit 199. Generally, the component with a density below that of lean meat will be liquid carbon dioxide. Liquid carbon dioxide will generally accumulate as a stratum defined between the dotted lines 105 and 122. Liquid carbon dioxide may exit through the beach face 171 at the cone-shaped section 125 through apertures 126 and 170 in the beach face 171, which are at a height of the stratum defined between the dotted lines 105 and 122. The liquid carbon dioxide passes between the beach face 171 and the outer housing through the annular space 168, defined by the outer wall of conduit 138 and the inner wall of conduit 137, eventually leaving the centrifuge 1000 through outlet conduit 132. Conduit 132 is connected to a system for chilling the carbon dioxide, as discussed below, so as to enable recycling of liquid carbon dioxide. Generally, lower in density than liquid carbon dioxide will be fat and adipose tissue. Fat will generally accumulate in a stratum defined by the dotted lines 122 and 128. This material will be transferred via the inner screws 188, 174 towards the beach face 171, and below the apertures 126, 170 to minimize transfer out with liquid carbon dioxide, through the narrowed conduit 138, and is discharged through outlet 160. The least dense component will generally be any gas, such as carbon dioxide, carbon monoxide, any noble gas, or combinations of gas. Such gas accumulates in a stratum defined by the dotted line 113, and will fill the volume surrounding the central axis of the centrifuge. The outer boundary 113 of the concentric stratum of gas will generally need to be kept greater than the diameters (i.e., the perimeters) of the narrowed conduit 195 and the narrowed conduit 138 in order to displace the liquid carbon dioxide that tends to mix with the lean meat, as the lean meat passes through the stratum of liquid carbon dioxide in its path down the cone-shaped section 109. Note too, that the outer screw 120 has individual spiral flights that are about the thickness of the stratum of lean meat, which avoids also transferring liquid carbon dioxide with the lean meat. Such concentric layer of gas extends in thickness past the openings leading into the narrowed conduits 195 and 138. Such gas occupies the central concentric volume within the housing 186 bounded by the dotted line 113. As can be appreciated such boundary 113 extends beyond the diameter of the narrowed section 195 through which the lean meat is transferred. Because the gas occupies the central volume of the centrifuge 1000, the gas acts as a barrier by displacing liquid carbon dioxide with gas, which is carried with the most dense component, i.e., the lean meat, via section 195 and conduit 199. As can be appreciated from the foregoing description, the centrifuge produces concentric zones of stratification based in order of decreasing density toward the central axis, wherein the most dense components accumulate next to the interior surface of the housing 186, and the least dense components being at the center of the centrifuge.

Operation of the centrifuge to separate meat components into lean and fat is based on the density differences between components. The carbon dioxide fluid will be pressure controlled, preferably from 400 to 560 psig, more preferably from 440 to 520 psig, or even more preferably from 460 to 500 psig, with a suitable pressure being about 480 psig, such that the density of carbon dioxide is less than the density of the lean meat and greater than the density of the fat. The density of the liquid carbon dioxide being from 45 to 65 pounds per cubic foot, preferably from 50 to 60 pounds per cubic foot, and more preferably from 52 to 58 pounds per cubic foot. Changing the density of the liquid carbon dioxide is believed to affect the separation efficiency. The housing 186 is rotated by a variable speed motor, such as an electric or hydraulic motor, which is attached thereto in such a manner that enables the rotating of housing 186 at a controlled speed (revolutions per minute), such as at from 300 rpm to 1000 rpm, with 500 rpm being suitable, but, preferably at such a speed (rpm) that will cause an artificial increased gravitation field to be applied to the carbon dioxide fluid and ground meat transferred into housing 186.

Variable speed positive displacement pumps are connected directly to all input and output conduits connected to the interior of the centrifuge 1000, in such a way that pressure can be maintained within the centrifuge. Pumps transferring ground meat and carbon dioxide via conduit 130 are controlled to provide a selected input combined mass flow while extraction positive displacement pumps are connected to output conduits so as to enable the extraction of processed materials, such as liquid carbon dioxide via outlet 132 to be cleaned and recycled, fat via outlet 160, and lean meat via outlet 199. The pressure within centrifuge 1000 is controlled such that the density of the fluid carbon dioxide is maintained at a selected value, such as 45 to 65 pounds per cubic foot, preferably about 57 pounds per cubic foot. The materials transferred into centrifuge 1000 are also maintained at a selected temperature, which can be adjusted by adjusting the pressure. Beef transferred into centrifuge 1000 can be maintained at a pressure of about 500 psig to about 2000 psig.

The housing 186 is manufactured from stainless steel, carbon steel or any other rigid material capable of withstanding the pressure ranges described herein. The diameter of housing 186 may be in the order of 30 inches and is rigidly attached at each end to cone-shaped sections each tapering and connecting to conduits having a smaller diameter than housing 186 and parallel thereto. The dotted lines 113 and 181 define a central annular, volume 110 which can be filled with pressurized carbon dioxide gas having been transferred therein via conduit 108 at a pressure, such as about 480 psig, such that when lean meat is transferred across the internal beach face of cone-shaped section 109, the dense fluid (liquid) carbon dioxide which occupies the annular space defined by dotted lines 105 and 122 is not carried with the lean meat and is displaced by gaseous carbon dioxide in such a way that the lean meat (beef) transferred into and through conduit 195 does not carry excessive quantities of carbon dioxide therewith.

The annular space defined by and between dotted line 105 and 162 and the internal face of housing 186 shows a fraction of the internal space of housing 186 where the most dense material, i.e., lean meat, such as lean beef will accumulate; the dotted lines 105 and 122 define the boundaries of an annular space wherein fluid and/or liquid carbon dioxide will tend to accumulate and the annular space defined between dotted lines 122 and 113 comprises the annular space in which the least dense ground meat fat component will accumulate after centrifuging therein. After or during centrifuge separation, materials will be removed from the centrifuge 1000, as discussed above.

The centrifuge shown in FIG. 1, including housing 186, cone-shaped section 109, conduit 195, and cone-shaped section 169 with conduit section 137, are rigidly connected to provide a sealed and gas tight vessel, which is located and held captive by variable drive wheels 104, 202, 112, 178, 131, and 163, which rotate the centrifuge vessel 186 at speeds to produce a separating force equal to as much as 3000 G, wherein one (1) G is the equivalent of the gravitational force at the surface of the earth. However, when used in applications to separate beef fat from beef lean, the speed of the rotating centrifuge may be limited to just a few hundred rpm, exerting a centrifugal force on the materials in the order of a few hundred G or even substantially less. A relatively low G force on the order of 30 to 100 G can provide sufficient force to quickly separate beef adipose fat from lean beef, maintained at a temperature of approximately 32-34 degrees F. The pressure within housing 186 is controlled and adjustable from 300 psig to 1100 psig, but preferably is at about 480 psig (and at a temperature of about 38° F.). The total rate of volume flow, for example, can be about 250 gallons per minute (gpm), and a similar quantity of material can be extracted.

A positive displacement pump is connected to conduit 199 to transfer lean meat at a controlled rate proportional to the ground meat being transferred into the housing 186. Ports 126 and 170 in beach face 171 in the cone-shaped section 125 allow surplus liquid carbon dioxide to be transferred through annular space 168 into annular manifold 165 and through conduit 132. Conduit 132 is connected to a pressure and mass flow controlling, second positive displacement pump. A third pressure and mass flow controlling, positive displacement pump is connected to conduit 160 such that fat can be extracted from centrifuge 1000. First, second and third positive displacement pumps (not shown) respectively connected to conduits 199, 132 and 160, are controlled via a central computerized controlling system in such a manner that goods transferred by controlled variable speed positive displacement pumps through grinder 148 plus liquid carbon dioxide transferred through conduits 156 and 142, which are also transferred by positive displacement pumps, are substantially of equal mass and balanced with the materials being extracted by pumps connected to conduits 199, 132, and 160, such that the mass of materials pumped into housing 186 are substantially equal to the mass of materials pumped from housing 186. Additionally, as discussed above, conduit 108 provides a means of injecting gaseous phase carbon dioxide into centrifuge 1000, via apertures 204. As discussed above, gaseous carbon dioxide minimizes the quantity of liquid carbon dioxide that is lost from the centrifuge 1000 with the lean meat. Gaseous phase carbon dioxide or any other gas, such as nitrogen and/or a blend of carbon dioxide may include carbon monoxide, wherein the carbon monoxide content is not more than about 0.4% by volume (or weight). Accordingly, by centrifugally spinning the mixture of ground meat containing fat components and lean meat components, the fat accumulating at zone defined by lines 122 and 113 can be transferred from the centrifuge 1000 via conduit 160 by rotating the Archimedes screw assembly, simultaneously, lean meat accumulating in spaces 176 and 119 is transferred through conduit section 195 into space 106 and discharged via conduit 199. Liquid carbon dioxide is extracted via conduit 132 in the direction of arrow 134. Liquid carbon dioxide extracted via conduit 132 can be recycled after sanitizing, filtering and adjusting so as to meet pressure and temperature settings, and reintroduced into conduits 142 and 156.

The centrifuge disclosed herein provides for the separation of two solids (i.e., fat and lean beef) and one liquid (liquid carbon dioxide), wherein the liquid (carbon dioxide) is a gas at ambient atmospheric conditions. In this way, the liquid carbon dioxide can be used as an agent facilitating the separation of the two solids (fat and lean beef) and after use of the liquid for this purpose, the liquid evaporates leaving no residue with the solids.

Referring now to FIG. 2, a diagrammatic representation of a plan view of processing equipment intended for use in the separation of fat and lean beef from ground beef in accordance with one embodiment of the present invention is shown. The apparatus shown is arranged to facilitate the recycling of liquid carbon dioxide, used in the centrifuge separation process. A rigid steel frame 9 is shown with a "bowl" 8 wherein, "bowl" is a term used in industry to describe the horizontal (or vertical) member which is driven by a variable motor, such as an electric or hydraulic motor, such that it rotates about an axis. The bowl 8, mounted onto frame 9, is an apparatus similar to that which is represented by FIG. 1, with the changes as noted herein. A refrigeration unit 21 with condenser 49, which may be an R22 chiller (or even liquid carbon dioxide, is arranged to chill recycled fluid, such as 50% propylene glycol, or brine, to a temperature of about 25° F., wherein brine can include any fluid, such as glycol or water and ethanol or any blend of fluids. The recycled fluid is transferred via conduit 27 in the direction shown by arrow 34 to a plate heat exchanger 30 mounted upon frame 31, which may comprise a rigid steel weldment or steel casting. After absorbing heat from a relative hot fluid, the fluid is then returned in the direction shown by arrow 29 via conduit 26 to the refrigeration unit 21. The refrigeration unit 21 includes a heat exchanger enabling the controlled temperature reduction of the recycled fluid, which can be pumped there through at a controlled mass flow rate wherein the temperature of the fluid may be reduced to 25 degrees F. The plate heat exchanger 30 is arranged with a series of steel plates and suitable sealing means, such as "O" rings. The term "plate heat exchanger" is used in industry to describe a special type of heat exchanger which can be opened to enable cleaning. In a plate heat exchanger, any number of plates and sealing means ("O" rings) can be arranged in a sandwiched arrangement with each plate in vertical disposition, parallel and "in line" with each other plate and also arranged to slide horizontally along retaining shafts rigidly attached to frame 31. Retaining shafts are arranged such that steel plates can be opened and spread apart from each other enabling the cleaning of each plate on both sides. The construction of the plate heat exchanger 30 with frame 31 can be more readily understood with reference to FIG. 3, wherein a full side view elevation is shown. A rectangular steel plate 42 with vertical edge 36 and horizontal edge 33 is shown with four apertures 39, 37, 43, and 40 arranged wherein each aperture is located at a corner of the rectangular plate 42. The purpose of the plate heat exchanger 30 is to enable the temperature control of any fluid, for example, the liquid carbon dioxide from a centrifuge, which may contain a food or fat component or particles of protein wherein the particles can contact, adhere and become bonded to the heat exchange surface. Two fluids, one "cold," one "hot," are processed simultaneously with the plate heat exchanger. The cold fluid, such as 50% glycol, is recycled through the refrigeration unit and passes on one side of the plates in the plate heat exchanger 30. The hot fluid passes on the side of the plates that are opposite of the cold fluid. The hot fluid releases heat across the plates and the heat raises the temperature of the cold fluid, thereby driving the temperature of the hot fluid down and the temperature of the cold fluid up. The plate heat exchange 30 can be a co-current or counter-counter exchanger. Pressure, flow and temperature measuring devices, are located at any one or more of the inlets and outlets of the plate heat exchanger 30, from which readings the flow, pressure or temperature of one or both fluids can be controlled. Any style of heat exchanger may be used, including, for example, a shell and tube heat exchanger, however, in this instance, a plate heat exchanger is illustrated.

Steel plate 42 shown in FIG. 3 is profiled with a series of depressions formed in continuous channels 44 and a sealing mechanism, such as an "O" ring, is located in a corresponding "O" ring groove, such that a selected quantity of steel plates can be pressed and clamped together in a sealing manner with "O" ring seals located between each plate. Multiple steel plates similar to the single steel plate shown as 42 in FIG. 3 are stacked in a sandwiched arrangement, wherein the two opposite faces of each plate are in contact with a face of an adjacent plate to provide a group of plates, which are then clamped together such that one fluid can be transferred along the channels on one side of each plate, and the second fluid is transferred along the channels on the opposite side. Thereafter, plates can be added or removed to adjust the total surface area available for heat transfer. In one embodiment, the steel plates are arranged such that the cold fluid recycled along conduits 27 and 26 and through refrigerated heat exchanger 21 can enter at aperture 37 and exit at aperture 40. Aperture 37 can be connected to conduit 27 in FIG. 2 and aperture 40 in FIG. 3 can be connected to conduit 26 in FIG. 2. In this way, temperature controlled cold fluid transferred via conduit 27 can travel by reticulation along the channels in each steel plate and across the surface of the plate and then through aperture 40 and into conduit 26 to be returned to refrigeration unit 21. The cold fluid can be at a temperature such as 24 degrees F. Hot fluid, such as liquid carbon dioxide, can be transferred in the direction shown by arrow 12 through conduits 45 and 35 into steel plate heat exchanger 30 between opposite sides of the steel plates and then through conduits 32 and 18 in the direction shown by arrow 22. Liquid carbon dioxide can, therefore, be cooled. Liquid carbon dioxide may be cooled from 0° F. to 66° F., from 26° F. to 36° F., preferably, 28° to 34° F., and even more preferably 30° F. to 32° F. Conduit 35 corresponds and connects directly with aperture 39 shown in FIG. 3 and conduit 32 corresponds directly with aperture 43 in FIG. 3. Conduit 45 is a feed line to plate heat exchanger 30 and conduit 32 is a return line from plate heat exchanger 30 for liquid carbon dioxide used in the centrifuge separation process of the apparatus of FIG. 2. Conduit 45 is connected directly to manifold 2 (FIG. 2) such that fluid extracted from bowl 8 is run through the plate heat exchanger 30 and cooled and is returned to bowl 8 through manifold 48 (FIG. 2).

Referring briefly to FIG. 1, apertures 126 and 170 are provided in the beach face 171 of the cone-shaped section 125. Apertures 126 and 170 connect to annular conduit 137 enabling the extraction of liquid carbon dioxide from zone 118 through annular space 168 and into manifold 165, which connects to conduit 132. Similar apertures, beach face, annular space, manifold and conduit may be provided at the opposite end of vessel 186 at the cone section 109, but are not illustrated. In this way, liquid carbon dioxide could be withdrawn from conduit 132, and after chilling in the plate heat exchanger 30 (FIG. 2) can be introduced into housing 186 at the opposite end from conduit 132. This has the advantage that the consumption of carbon dioxide for the purpose of chilling ground beef is reduced and can be minimized to provide improved economy.

Referring again to FIG. 2, ground beef blended with a controlled proportion of liquid carbon dioxide having a ratio of 1 part ground beef or less to 1 part liquid carbon dioxide or less, or alternatively, having any ratio of liquid carbon dioxide to ground beef content, can be transferred into conduit 47 in the direction shown by arrow 16. Preferably, the temperature of the ground beef will be determined and then adjusted to meet the temperature of the carbon dioxide liquid with which it will then be blended. Such temperature adjustment can be achieved by compensation wherein lowering the temperature of the liquid carbon dioxide is facilitated to such a degree that after blending with the beef, the "averaged" temperature of the blend will be equal to the required temperature, e.g., 34 degrees F.

Liquid carbon dioxide can be introduced into manifold 48, which in turn connects with bowl 8, and ultimately can be extracted from manifold 2. A quantity of water may also be blended with liquid carbon dioxide and transferred into bowl 8 via manifold 4. Water making up about 2% by weight, can be blended with the carbon dioxide prior to blending the resultant mixture with ground beef in proportions that will result in a blend of carbon dioxide, beef, and water to compensate for any moisture that will be lost due to hydration of the carbon dioxide gas that may ultimately boil off into the atmosphere after extraction from the centrifuge. Water may be about 1% to 3% by weight (or volume) of the quantity of beef blended with the carbon dioxide (and water). Fat separated from ground beef in a manner as described in connection with FIG. 1 can be extracted via manifold 46. Lean beef separated from ground beef in a manner as described in connection with FIG. 1 can be extracted from conduit 1. Cone-shaped ends 7 and 10 are arranged in similar manner to cone-shaped sections 109 and 125 in FIG. 1. Bearings 11 and 51 are provided to enable the precise and unrestricted rotation of bowl 8 with concentric conduits 1, 41, and 5 at one end, and 47, 17, and 12 at the opposite end of bowl 8. The operation of centrifuge apparatus shown in FIG. 2 with bowl 8 can be arranged so as to operate similarly to bowl 186 as shown in FIG. 1; however in FIG. 2 two additional manifolds 2 and 4 are shown. Lean meat separated from ground beef transferred into conduit 47 is extracted from conduit 1. Fat separated from ground beef transferred into conduit 47 can be extracted via manifold 46. Temperature controlled liquid carbon dioxide having been treated in plate heat exchanger 30 (FIG. 2) with refrigeration unit 21 can be transferred into bowl 8 via conduit 48, and an equal quantity of liquid carbon dioxide can be extracted from the bowl 8 via conduit 2.

Referring to Table 10 below, properties of saturated carbon dioxide liquid and/or vapor are shown in units of pressure (psi), temperature (degrees F.) and density (lbs/cu. ft.) Carbon dioxide at a temperature of 0 degrees F., for example, as shown in row 2, will have a density of 63.64 lbs/cubic foot at 305.8 psia. Row 3 shows the data for carbon dioxide at 28 degrees F., which has a density of 58.78 lbs/cubic foot. A total of 13 sets of data are shown for carbon dioxide at temperatures with the corresponding pressure and density values. Fluid carbon dioxide can be provided at any temperature, pressure and density described. For example, fluid carbon dioxide may be provided into the centrifuge shown in FIGS. 1 and 2 adjusted to a temperature of 30 degrees F. and at a rate of approximately 100 gallons/minute, in which case, the pressure and density would be as shown in row 4. Carbon dioxide extracted via manifold 2 may have a temperature of about 36 degrees F., and at 36 degrees F. and at a pressure of 521.3 psig, the density will be 57.12 lbs/cubic feet as shown in row 7. The apparatus shown in FIG. 2 and FIG. 3 includes a refrigeration and plate heat exchange system enabling fluid carbon dioxide extracted at 36 degrees, for example, from manifold 2 to be pressurized and chilled to, for example, 30 degrees F., with the pressure and density as shown in row 4. The input temperature and extraction temperatures may be at any selected temperature shown in rows 2 through 14 with the corresponding other properties also shown in each row. Gaseous carbon dioxide can be transferred into vessel 8 via manifold 4 at 60 degrees F. to 100 degrees F. or higher or lower. All other units shown in row 13 may apply to such carbon dioxide transferred and the mass flow can be as required to maintain sufficient volume to fill annular space 110 in FIG. 1 so that the boundary 113 of the stratum of gas is able to minimize the amount of liquid carbon dioxide that leaves with the lean meat. It is preferable that the density of carbon dioxide fluid transferred into space 110 in FIG. 1 is as low as possible while maintaining sufficient pressure to enable the effective stratification of fat and lean beef separated from ground beef as described. However, it is also desirable to maintain a lower temperature (i.e., about 30 degrees F.) of the liquid carbon dioxide used in the process, particularly where the liquid carbon dioxide comes in contact with the lean beef. Clearly under such circumstances a conflict can arise between lower gas density and low liquid temperature, however, gas in space 110 can be maintained at the lowest density possible, while the density of fluid carbon dioxide in space 118 and elsewhere in the centrifuge system, can be maintained at the density, which is required, while maintaining a temperature of about 30 degrees F. The method in accordance with one embodiment of the present invention enables the separation of a first fat stream and a second lean stream from a third incoming stream including a blend of ground beef and fluid carbon dioxide, wherein the fluid carbon dioxide is maintained with properties as shown in rows 4 through 7 in Table 10, for example. A minimum quantity of carbon dioxide fluid is carried with the fat and the lean streams through their respective extraction conduits to be subsequently wasted by venting to atmosphere.

Such venting of carbon dioxide to atmosphere will result in a further loss of moisture (water) which will have ordinarily been extracted from the ground beef; compensation of this water loss is made up by the introduction of water through conduit 4 (FIG. 2). The volume of gas transferred, for example, via conduit 108 (FIG. 1), is sufficient to enable the displacement of liquid carbon dioxide from the lean beef transferred to the cone-shaped section 109. Perforations in shaft 108 similar to the perforations 204 can be provided at any locations in the walls of shaft 108, such as at regions close to conduit 195. Sufficient gaseous carbon dioxide is provided into the central space 110 of the centrifuge, and within the boundaries defined by the parallel broken lines 181 and 113, via any conduit so as to maintain space 110 filled with gaseous carbon dioxide in a manner that will allow the efficient separation of lean from fat and also the separation of liquid carbon dioxide by displacement with the gaseous carbon dioxide to avoid wasting liquid carbon dioxide. Any gas, such as other inert gases including nitrogen, neon, argon or any halogen gas can be provided into space 110 as shown in FIG. 1 at a selected pressure corresponding with the pressures shown in Table 10, so as to maintain the space 110 filled with sufficient gas. Further, the level of oxygen within the centrifuge 1000 is maintained at levels lower than 2000 ppm, preferably lower than 500 ppm, and even more preferably lower than 200 ppm. Such low levels of oxygen can be achieved by compacting the ground meat at the section 146, or by providing the upstream conduits in which the meat travels with gas other than air. Additionally, gas introduced through conduit 99 in screw 108 can be vented to remove oxygen.

It should be noted that carbon dioxide gas provided into space 110 in FIG. 1 can condense into lower temperature liquid carbon dioxide. Alternatively, any carbon dioxide gas provided at a temperature above the temperature of the liquid carbon dioxide that comes in contact with the lower temperature carbon dioxide will be cooled by the lower temperature, liquid carbon dioxide and consequently the volume of the gas will be reduced if it is not replenished by additional gas at a rate equal to a volume sufficient to compensate for the reduction in volume. However, the gas itself does provide an insulating effect and can act as insulation reducing the rate of condensing and/or the rate of volume reduction. The mass flow rate of carbon dioxide gas and fluids provided into and extracted from any and/or all ports is maintained at the selected pressures, respectively, by way of installed valves, positive displacement pumps and pressure regulators provided at some or all injection and extraction ports. While not shown in the FIGS. 1-3, positive displacement pumps, valves and pressure regulators of suitable capacities are provided to maintain selected pressures, temperatures, and densities.

The size of particles comprising the ground beef can be selected by inserting a properly sized grinding plate 148, shown in FIG. 1. The size of the grinding plate 148 apertures can be arranged such that the minimum quantity of lean beef is carried with the fat, and also so that the minimum quantity of fat is retained in the lean beef. In order to achieve the most efficient system of lean beef separation from high fat ground beef, a two stage process can be arranged. In such process, a grinding plate aperture having a size of between ¼" and up to 1" diameter or even more can be used to grind boneless beef in a first grinding operation. Following such coarse grinding and separating of very high lean content beef in a first stream, a second fat stream containing a quantity of lean, such as a quantity equal to 10% or even 20% by weight of the fat stream, can then be ground using a grinding plate having apertures of 1/16" diameter up to ¼" diameter, or as may be determined to be an optimum grind plate size for a second stage processing operation. This second stage operation may be described as a fine ground stream which can then be processed through the centrifuge equipment as described in connection with FIGS. 1-3, such that, in this second or final stage, only fat is extracted in the fat stream and the lean stream may then be combined with other ground beef. If required, the fat stream derived in the "final" stage can be processed in a further stage by grinding via an even finer grind plate aperture size, such as 1/32" diameter, followed by processing according to the separation process as described herein.

In one alternate embodiment, a selected and proportioned quantity of water optionally containing a quantity of a salt, such as sodium chlorite, may also be blended with the meat and liquid carbon dioxide. The amount of sodium chlorite salt added can be that amount required to provide 500 parts per million (ppm) to 1.2% or more in solution. Any other salts or additives may be included in the mixture, however, sodium chlorite is a preferred salt since an anti-microbial effect can be achieved with such a blend. In addition, liquid carbon dioxide, maintained at a pressure of approximately 500 psi to 750 psi, and at a temperature of 29.5 degrees F. to 36 degrees F., when combined with sufficient water, can create a pH value of about 2.9, which is adequate to react with sodium chlorite, wherein the combined quantity is commonly known as acidified sodium chlorite which has anti-microbial properties capable of reducing bacteria content by several logs. Furthermore, the addition of sodium chlorite can be added in such proportions so as to adjust the density of the liquid carbon dioxide which can be utilized to enhance the separation of fat from lean. For example, the specific gravity of liquid carbon dioxide at about 725 psi and 32 degrees F. is about 0.94 and the addition of, for example, 3% water containing sodium chlorite of 1200 ppm can increase the specific gravity of the liquid carbon dioxide to a little under 0.95. At such specific gravity, wherein the fluid comprises liquid carbon dioxide and a solution of sodium chlorite in water, white fat will float quite readily. However at a specific gravity of 0.93, such white fat may tend to sink and prove difficult to separate from the lean beef.

TABLE 10

| Temp | Pressure | | Vol. cu'/lb. | Density lbs/cu' Solid or | Row |
|---|---|---|---|---|---|
| ° F. | psia | psig | Vapor | Liquid | 1 |
| 0 | 305.8 | 291.1 | 0.2906 | 63.64 | 2 |
| 28 | 476.6 | 461.9 | 0.1783 | 58.78 | 3 |
| 30 | 490.8 | 476.1 | 0.1722 | 58.4 | 4 |
| 32 | 505.5 | 490.8 | 0.1663 | 58.02 | 5 |
| 34 | 520.5 | 505.8 | 0.1602 | 57.59 | 6 |
| 36 | 536 | 521.3 | 0.1542 | 57.12 | 7 |
| 38 | 551.7 | 537 | 0.1482 | 56.7 | 8 |
| 40 | 567.7 | 553 | 0.1425 | 56.29 | 9 |
| 42 | 569.3 | 569.3 | 0.1372 | 55.89 | 10 |
| 50 | 652.9 | 638.2 | 0.1181 | 53.91 | 11 |
| 56 | 708.6 | 693.9 | 0.1054 | 52.37 | 12 |
| 60 | 747.6 | 732.9 | 0.09752 | 51.17 | 13 |
| 66 | 809.3 | 794.6 | 0.1372 | 49.08 | 14 |

While the preferred embodiment of the invention has been illustrated and described, it will be appreciated that various changes can be made therein without departing from the spirit and scope of the invention.

The invention claimed is:
1. A method for separating meat components, comprising:
   combining fat solids and lean meat solids with a fluid comprising water;

centrifugally spinning the fluid by centrifuge;

individually separating the fat solids and lean meat solids from the fluid, wherein the fat solids, the lean meat solids, and the fluid are separated in the same centrifuge;

controlling the temperature of the lean meat solids before separating; and controlling the temperature of separated fluid.

2. The method of claim 1, wherein the water comprises a salt.

3. The method of claim 1, wherein the temperature of the fat solids is controlled in a plate heat exchanger.

4. The method of claim 1, wherein before combining with the fluid, the fat solids are finely ground.

5. The method of claim 1, wherein the separated fat solids are combined with beef.

6. The method of claim 1, wherein the fluid further comprises carbon dioxide.

7. The method of claim 1, further comprising introducing sodium chlorite to inactivate bacteria.

8. The method of claim 1, wherein the oxygen content in the centrifuge is kept below 500 ppm.

9. The method of claim 1, further comprising feeding the centrifuge through a distributor having two oppositely disposed outlets.

* * * * *